United States Patent
Olesiewicz et al.

(10) Patent No.: US 7,697,277 B1
(45) Date of Patent: *Apr. 13, 2010

(54) AUTO-DEPRESS DISK DRIVE BRACKET MECHANISM

(75) Inventors: Timothy W. Olesiewicz, Dublin, CA (US); Brett C. Ong, San Jose, CA (US); William A. De Meulenaere, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/789,611

(22) Filed: Apr. 25, 2007

(51) Int. Cl.
*G06F 1/16* (2006.01)

(52) U.S. Cl. ............................. 361/679.34; 360/97.02; 358/1.15; 248/694; 710/311; 713/323

(58) Field of Classification Search ............... 360/244.3, 360/97.02; 358/1.9, 1.15; 248/71, 639, 694; 710/302, 311; 713/323; 361/679.33, 679.34, 361/679.35, 679.36, 379.43, 679.54
See application file for complete search history.

(56) References Cited

U.S. PATENT DOCUMENTS

| | | | | |
|---|---|---|---|---|
| 5,982,587 A | * | 11/1999 | Alagheband et al. | 360/256 |
| 7,535,704 B2 | * | 5/2009 | Olesiewicz et al. | 248/639 |
| 2008/0043434 A1 | * | 2/2008 | Tatsukami et al. | 361/697 |

* cited by examiner

*Primary Examiner*—Hung V Duong
(74) *Attorney, Agent, or Firm*—Osha • Liang LLP

(57) ABSTRACT

A hard disk drive bracket includes a bezel, a lever arm attached to the bezel rotatably between a closed position against the bezel and an open position apart from the bezel, a release mechanism attached to the bezel including a locking member that latches the lever arm in the closed position and a release button arranged to unlatch the lever arm from the locking member when the release button is depressed, and a horn attached to the bezel translatably between a natural position apart from the release mechanism and a forced position that allows the horn and release mechanism to interact to unlatch the lever arm from the locking member. The horn and lever arm of the hard disk drive bracket may be adapted to serve as a cam that automatically depress the release button as the lever arm is being closed.

10 Claims, 6 Drawing Sheets

AUTO-DEPRESS DISK DRIVE BRACKET MECHANISM

BACKGROUND OF INVENTION

Hard disk drive brackets come in many shapes and forms. Most of today's brackets are designed to accommodate standard 3.5" drives. Examples of hard disk drives brackets abound. Some examples of the hard disk drive brackets utilized in past products developed by Sun Microsystems, Inc. are shown in FIGS. 1-3 and described below.

FIGS. 1(a) and 1(b) show a 3.5" Hard Disk Drive (HDD) 911 bracket referred to as "SPUD" in closed and open positions, respectively. In the "SPUD," a spring 913 is utilized to bias the door 915 outward, and has a side actuated latch release 917.

FIGS. 2(a) and 2(b) show a 3.5" HDD bracket 921 referred to as "SPUD 3" in closed and open positions, respectively. In the "SPUD 3," a side-sliding latch release 927 and lever-arm spring 923 are included in order to swing the door 925 outward.

FIGS. 3(a) and 3(b) show a 3.5" HDD bracket 931 used in, for example, a "Sun Fire V20z" server. In this bracket 931, the release latch 937 is still a side action, but has been integrated into the lever arm 935.

SUMMARY OF INVENTION

In one or more embodiments of the present invention, a hard disk drive bracket comprises a bezel, a lever arm attached to the bezel rotatably between a closed position against the bezel and an open position apart from the bezel, a release mechanism attached to the bezel comprising a locking member that latches the lever arm in the closed position and a release button arranged to unlatch the lever arm from the locking member when the release button is depressed, and a horn attached to the bezel translatably between a natural position apart from the release mechanism and a forced position that allows the horn and release mechanism to interact to free the locking member from the path of the lever arm.

Other aspects and advantages of the invention will be apparent from the following description and the appended claims.

DETAILED DESCRIPTION

New generations of server platforms incorporate small form factor (SFF) 2.5" hard disk drives. Therefore, in accordance with one or more embodiments of the present invention, a new 2.5" hard disk drive (HDD) bracket was developed to serve as a common drive bracket for future product platforms incorporating swappable, 2.5" hard disk drives.

Embodiments of the present invention will be described below with reference to the drawings.

In order to support a multitude of HDD mounting applications across different products, the mechanical packaging requirements of the bracket are very constrained. In particular, because of the requirements for width and depth dimensions (e.g., for standard 78 mm×115 mm dimensions), little room is left for the bezel, mounting rails, and latch/release mechanism. In an application with such dimensions, only 8 mm of packaging depth is allowed at the front of the bracket for the front bezel, lever/locking arm, push button release, and latch. Accordingly, one or more embodiments of the present invention provide a bracket with a unique, low profile, low cost, and robust mechanism with parts that are resilient to manufacturing variations.

Figure 1A:
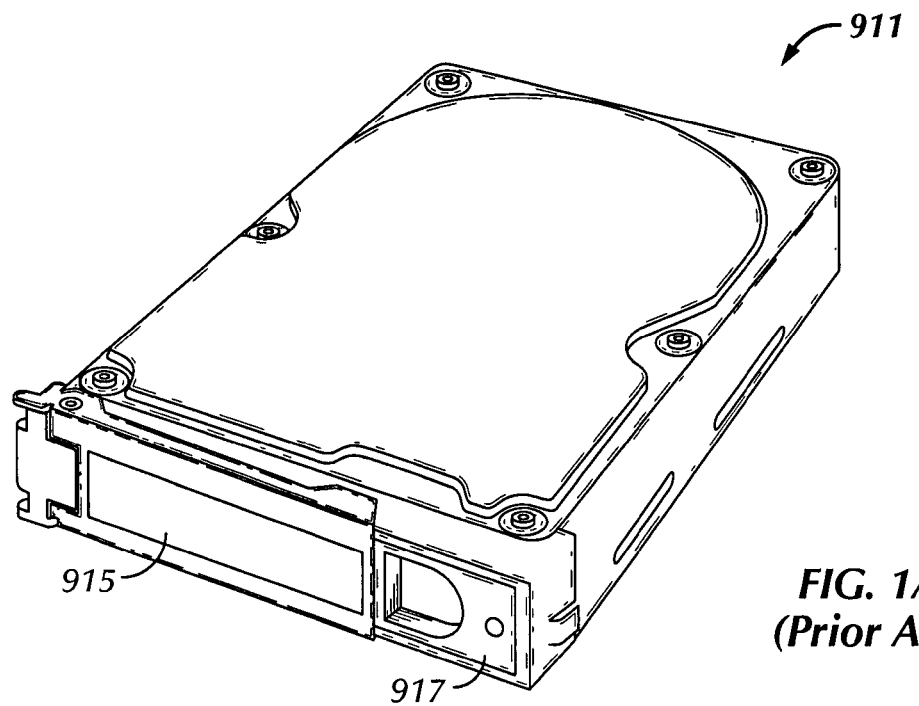
FIGS. 1(a) and 1(b) show a "SPUD" 3.5" HDD bracket.
Figure 1B:
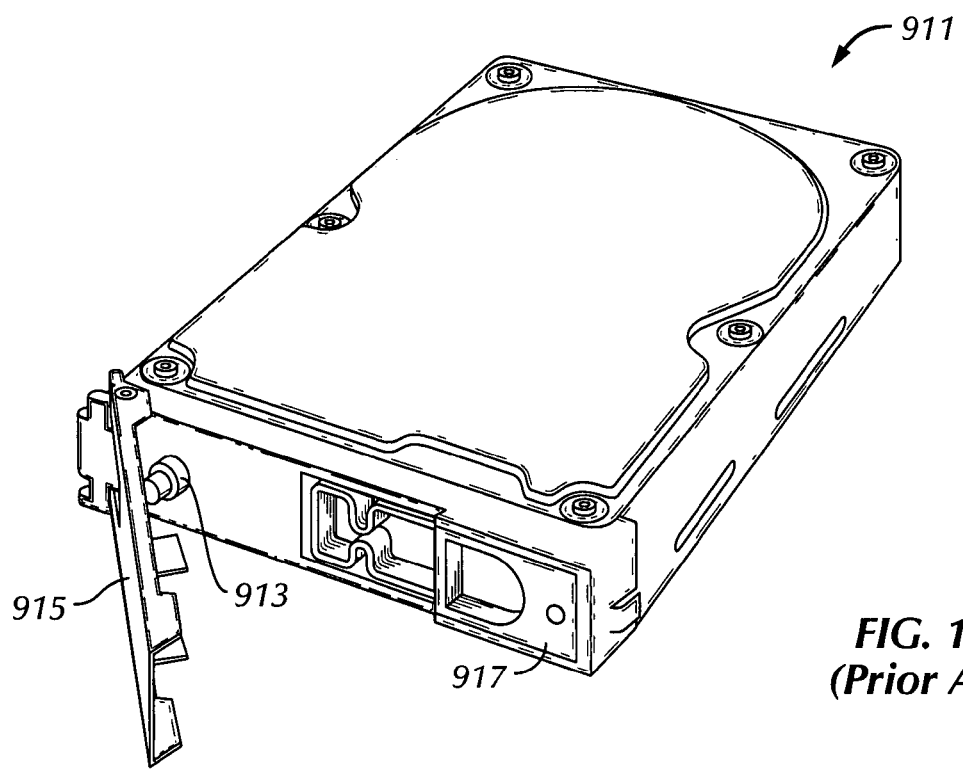
Figure 2A:
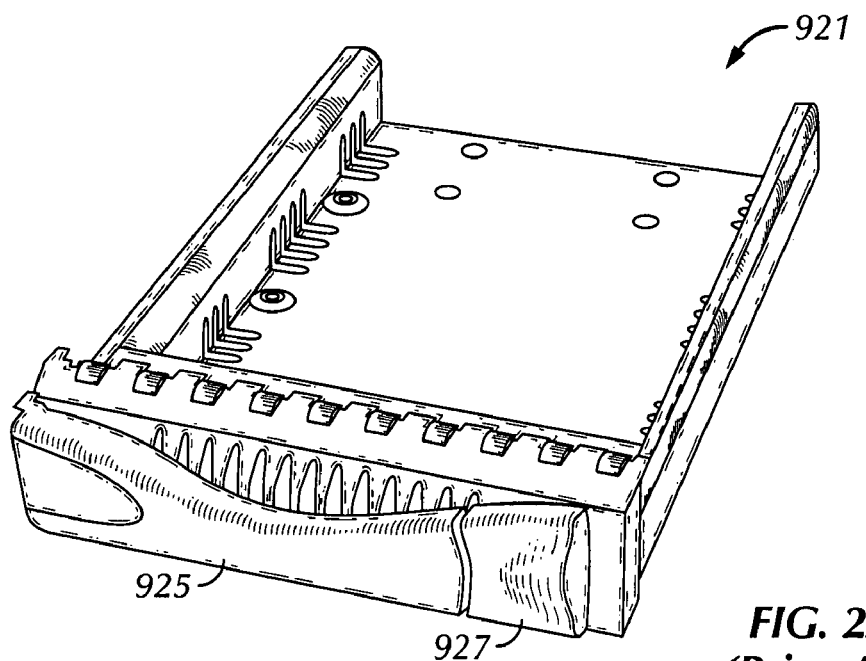
FIGS. 2(a) and 2(b) show a "SPUD 3" 3.5" HDD bracket.
Figure 2B:
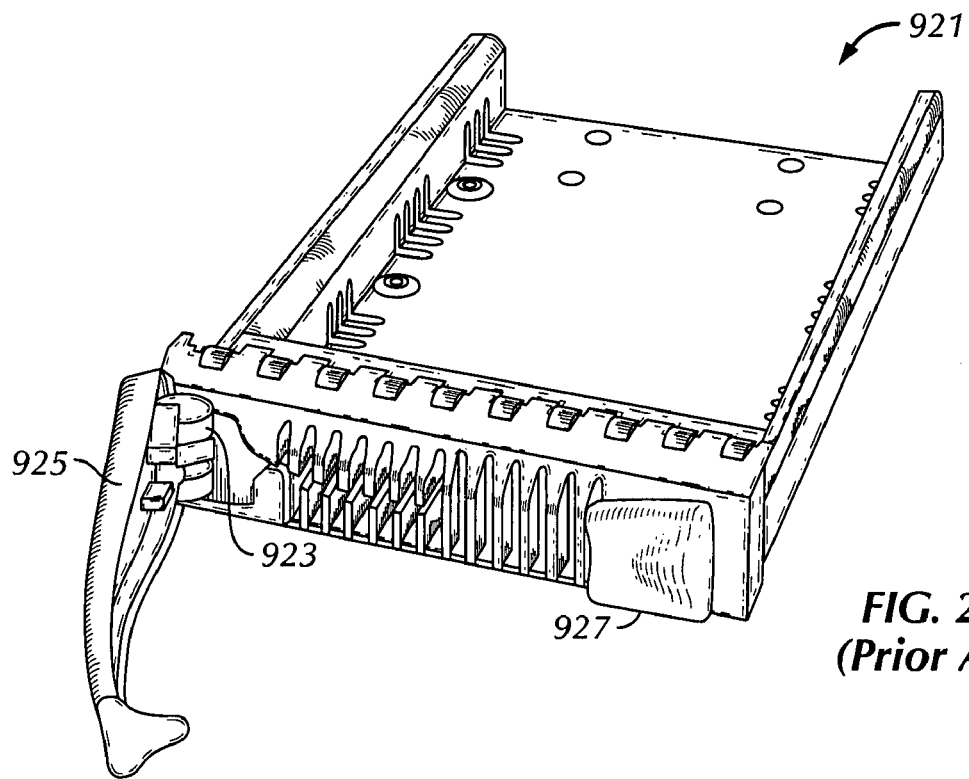
Figure 3A:
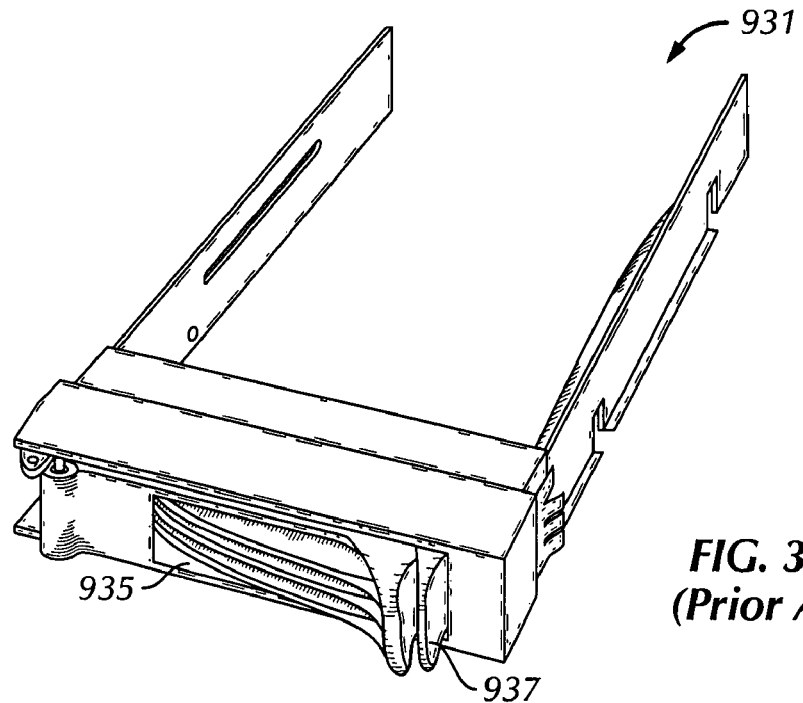
FIGS. 3(a) and 3(b) show a 3.5" HDD bracket used in, for example, a "Sun Fire V20z" server.
Figure 3B:
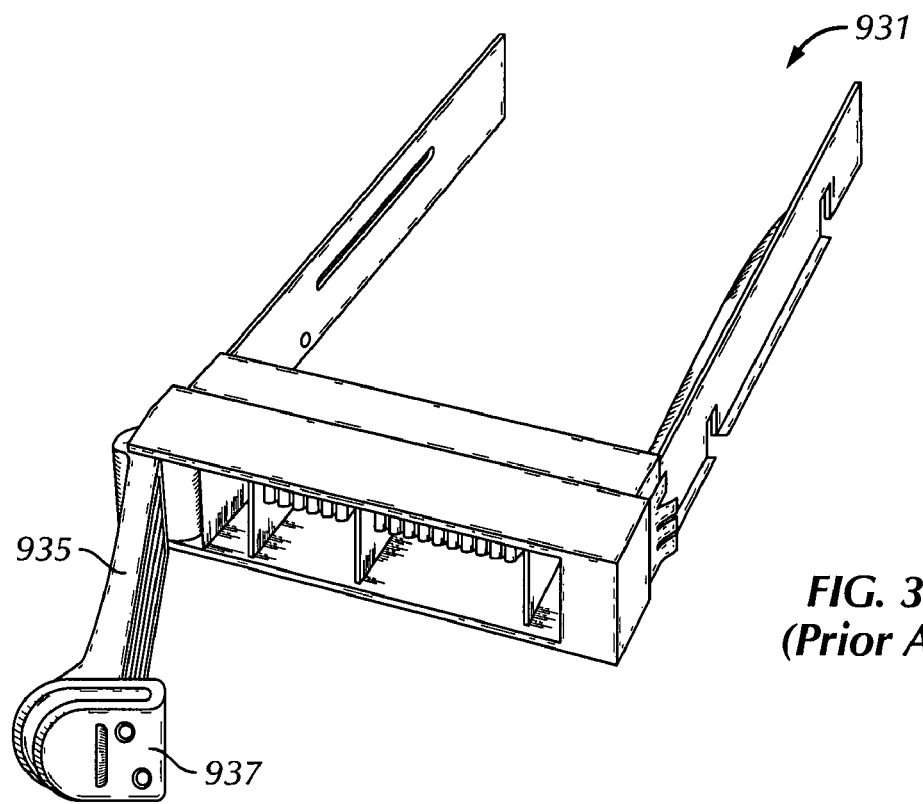
Figure 4A:
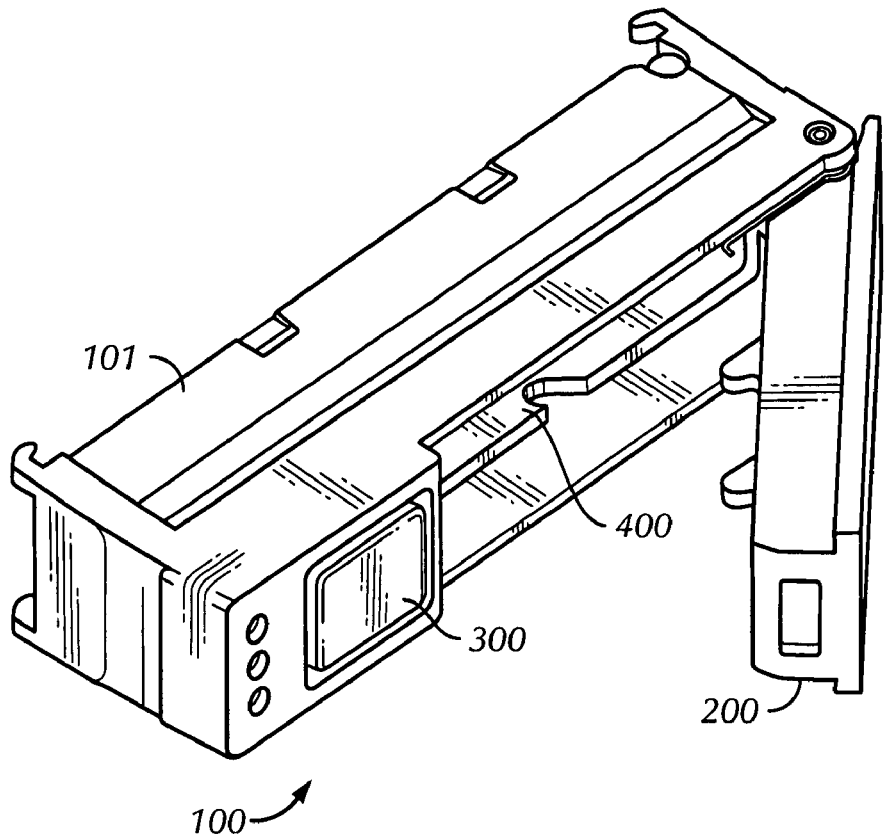
FIGS. 4(a) and 4(b) show front views of a HDD bracket in accordance with an embodiment of the present invention.
Figure 4B:
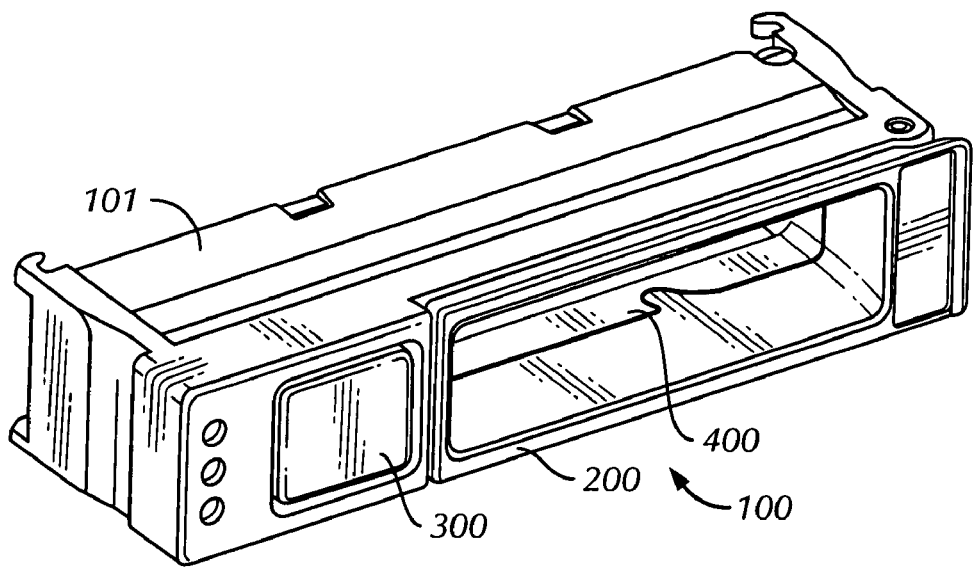

Referring to FIGS. 4(a) and 4(b), a front facing view of a HDD bracket 100 according to an embodiment of the present invention is shown. The HDD bracket 100 has a front bezel 101, on which lever arm 200, release mechanism 300, and horn 400 are disposed. FIG. 4(b) shows the lever arm 200 in the latched ("closed") position. To operate the HDD bracket 100, the user presses the release mechanism 300 and the lever arm 200 releases and automatically springs outward into the unlatched ("open") position as in 4(a). The user then inserts or removes a hard disk drive from the bracket and then closes the lever arm 200 to lock the hard disk drive in place.

Figure 5A:
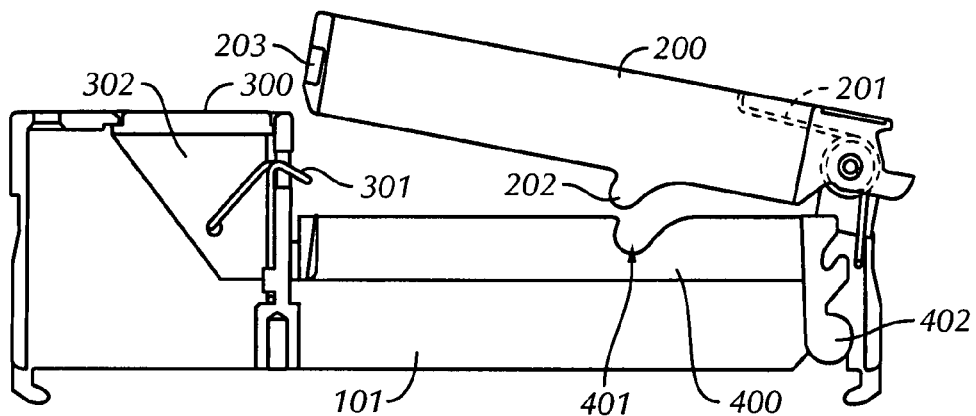
FIGS. 5(a), 5(b), and 5(c) show top views from inside of a HDD bracket in accordance with an embodiment of the present invention.

FIG. 5(a) shows a HDD bracket from the top view inside the bezel 101 with the lever arm 200 in the unlatched position. In the unlatched position the lever arm 200 is rotated apart from the bezel 101, the release mechanism 300, and the horn 400. The spring 201 biases the lever arm 200 to the unlatched position. The release button 302 is biased outward by the locking member 301 when the lever arm 200 is in the unlatched position. The horn 400 is in the horn's natural position and does not interact with any other elements when the lever arm 200 is in the unlatched position.

Figure 5B:
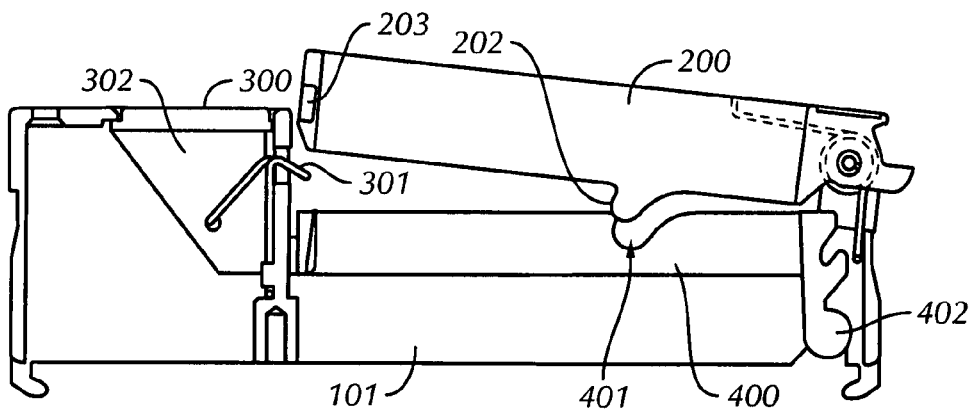

FIG. 5(b) shows a HDD bracket from the top view inside the bezel 101 as the lever arm 200 is rotating between the open and closed positions. Specifically, FIG. 5(b) shows a HDD bracket as a protrusion 202 from the lever arm 200 makes contact with the horn 400. In one or more embodiments, the distance from the slotted end 203 to the protrusion 202 is around 27 mm. The horn 400 is a mechanism attached to the bezel 101 translatably between the horn's natural position as shown in FIG. 5(a) and the horn's forced position shown in FIG. 5(b). The contact between the lever arm 200 and the horn 400 shown in FIG. 5(b) forces the horn to move from the horn's natural position to the horn's forced position. The horn comprises a cavity 401 and a pivot 402. The cavity 401 serves the purpose of allowing contact between the horn 400 and the protrusion 202 from the lever arm 200, thereby converting the force of closing the lever arm 200 into movement of the horn 400 from the horn's natural position to the horn's forced position. Thus, the combination of the lever arm 200, protrusion 202, cavity 401, and horn 400 serve as a cam to translate motion of the lever arm 200 into motion of the horn 400. The pivot 402 is adapted to attach the horn 400 to the bezel 101 so as to allow motion of the horn 400 between the horn's forced and natural positions.

FIG. 5(b) shows the interaction between the horn 400 and the release mechanism 300 in addition to the contact between the horn 400 and the lever arm 200. As the horn 400 is forced from the horn's natural position to the horn's forced position as the lever arm 200 is closing, the horn 400 interacts with the release mechanism 300 to automatically depress the release button 302. FIG. 5(b) shows horn 400 in the horn's forced position, thereby making contact with the release mechanism

300 and depressing the release button 302. The purpose of depressing the release button 302 during the closing of the lever arm 200 is to clear the locking member 301 from the path of the lever arm 200. Clearing the locking member 301 from the path of the lever arm 200 allows for smooth and consistent operation of a HDD 100.

Figure 5C:
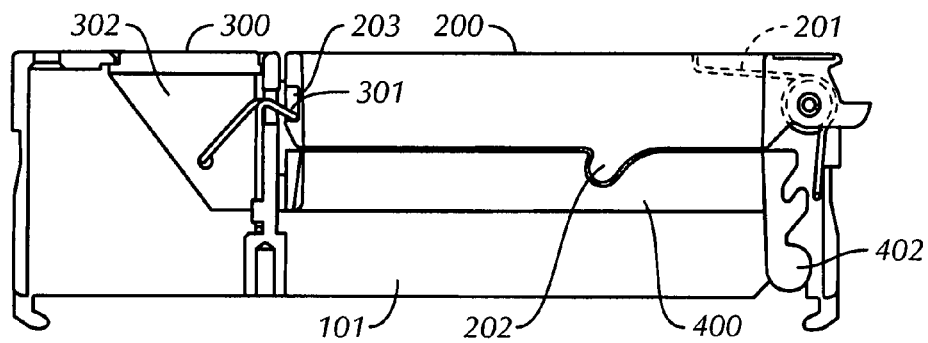

FIG. 5(*c*) shows a HDD bracket from the top view inside the bezel 101 when the lever arm 200 is in the latched position. When the lever arm 200 is in the latched position, the shapes of the cavity 401 (as shown in FIG. 5(*b*)) and protrusion 202 allow the horn 400 to return to the horn's natural position in which the horn 400 does not interact with the release mechanism 300. Thus, the release button 302 is again biased outward, and the locking member 301 impedes the path of the lever arm 200. In the latched position, the locking member 301 is captured by the slotted end 203 of the lever arm 200, thereby securing the lever arm 200 closed. In addition to allowing the horn 400 to return to the horn's natural position, the shapes of the cavity 401 (as shown in FIG. 5(*b*)) and protrusion 202 also help to secure the lever arm 200 in the closed position. In an alternative embodiment of the present invention, the interaction between the horn's cavity 401 (as shown in FIG. 5(*b*)) and the lever arm's protrusion may serve as the locking member 301, thus eliminating the need for a separate embodiment of the locking member.

Figure 6:
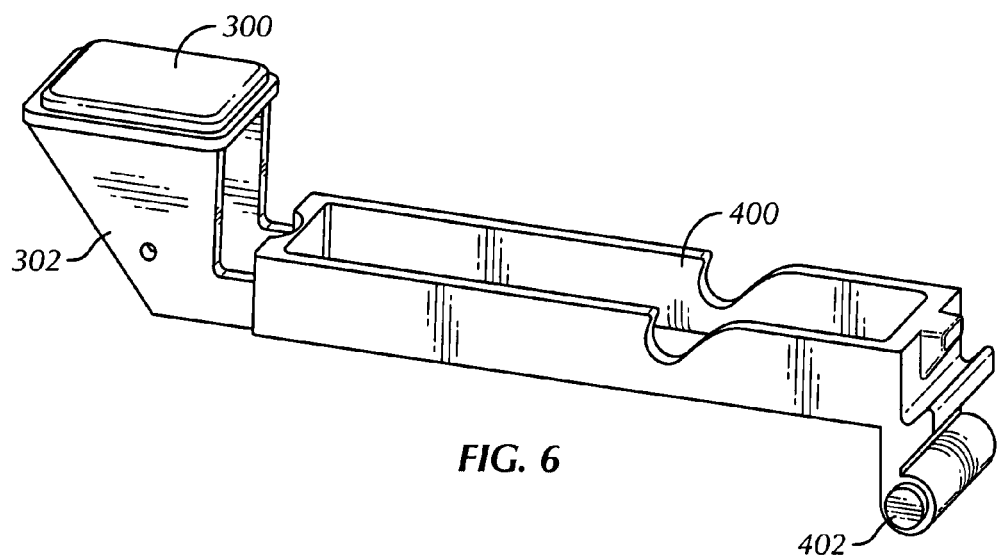
FIG. 6 shows a unitarily formed release button, horn, and pivot in accordance with an embodiment of the present invention.

In one or more embodiments of the present invention, the release mechanism may be a unitarily formed body comprising the release button, horn, and pivot. FIG. 6 shows one such embodiment of the release mechanism 300. Advantages of this embodiment include further reduction of part count in the invention as a whole and more reliable operation of the invention.

One or more embodiments of the present invention may include one or more of the following advantages: more secure retention of the lever arm 200; the mechanism is entirely internal, low profile, and does not impede airflow; the mechanism has a low part count and therefore low cost; the user-interface is intuitive and equivalent to what users are used to; the mechanism allows for smooth and consistent operation of the bracket; and the design of the mechanism is robust to manufacturing variation and inconsistencies despite the small size of HDD brackets.

While the invention has been described with respect to a limited number of embodiments, those skilled in the art, having benefit of this disclosure, will appreciate that other embodiments can be devised which do not depart from the scope of this invention as disclosed herein. Accordingly, the scope of the invention should be limited only by the attached claims.

What is claimed is:

1. A hard disk drive bracket comprising:
    a bezel,
    a lever arm attached to the bezel rotatably between a closed position against the bezel and an open position apart from the bezel,
    a release mechanism attached to the bezel comprising:
        a locking member that latches the lever arm in the closed position; and
        a release button arranged to unlatch the lever arm from the locking member when the release button is depressed; and
    a horn attached to the bezel translatably between a natural position apart from the release mechanism and a forced position that allows the horn and release mechanism to interact to unlatch the lever arm from the locking member.

2. The hard disk drive bracket of claim 1, further comprising a spring attached to the lever arm and bezel.

3. The hard disk drive bracket of claim 1, the lever arm comprising a slotted end that latches to the release mechanism in the closed position.

4. The hard disk drive bracket of claim 1, wherein the locking member is a wireform attached to the bezel and release button, and the wireform is adapted to latch the lever arm in the closed position and unlatch the lever arm when the release button is depressed.

5. The hard disk drive bracket of claim 4, wherein the locking member biases the release button outward.

6. The hard disk drive bracket of claim 1, wherein the lever arm and horn are adapted to function as a cam that converts motion of the lever arm to motion of the horn, thereby allowing the horn to interact with the release mechanism, depressing the release button.

7. The hard disk drive bracket of claim 6, wherein the lever arm has one or more protrusions that make contact with the horn during rotational motion of the lever arm.

8. The hard disk drive bracket of claim 7, wherein the horn has one or more cavities designed to receive the protrusions from the lever arm.

9. The hard disk drive bracket of claim 8, wherein the cavities in the horn and the protrusions from the lever arm secure the lever arm shut, thereby effectively serving as the locking member.

10. The hard disk drive bracket of claim 1, wherein the release mechanism is a single, unitarily formed body comprising the release button, horn, and pivot.

\* \* \* \* \*